(12) United States Patent
Sugita et al.

(10) Patent No.: US 9,178,401 B2
(45) Date of Patent: Nov. 3, 2015

(54) LINEAR MOTOR

(71) Applicant: SANYO DENKI CO., LTD., Tokyo (JP)

(72) Inventors: Satoshi Sugita, Tokyo (JP); Yasushi Misawa, Tokyo (JP); Shigenori Miyairi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 216 days.

(21) Appl. No.: 13/967,507

(22) Filed: Aug. 15, 2013

(65) Prior Publication Data

US 2014/0054979 A1 Feb. 27, 2014

(30) Foreign Application Priority Data

Aug. 23, 2012 (JP) ................. 2012-184312

(51) Int. Cl.
*H02K 9/20* (2006.01)
*H02K 41/03* (2006.01)
*H02K 1/20* (2006.01)
*H02K 41/02* (2006.01)

(52) U.S. Cl.
CPC .. *H02K 9/20* (2013.01); *H02K 1/20* (2013.01); *H02K 41/02* (2013.01); *H02K 41/031* (2013.01)

(58) Field of Classification Search
CPC ........... H02K 9/20; H02K 9/06; H02K 41/02; H02K 1/20; H02K 41/031
See application file for complete search history.

(56) References Cited

U.S. PATENT DOCUMENTS

| | | | | |
|---|---|---|---|---|
| 6,946,755 | B2* | 9/2005 | Tamai et al. | 310/12.24 |
| 6,954,010 | B2* | 10/2005 | Rippel et al. | 310/60 A |
| 7,952,243 | B2* | 5/2011 | Sopp | 310/64 |
| 2011/0316358 | A1* | 12/2011 | Sugita et al. | 310/12.29 |

FOREIGN PATENT DOCUMENTS

| | | |
|---|---|---|
| JP | 2004304932 A | 10/2004 |
| JP | 2008035698 A | 2/2008 |

* cited by examiner

*Primary Examiner* — Dang Le
(74) *Attorney, Agent, or Firm* — Novak Druce Connolly Bove + Quigg LLP

(57) ABSTRACT

An armature of a linear motor includes a plurality of cooling pipe storage holes formed along a longitudinal direction of a core, and a plurality of cooling pipes stored vertically in the cooling pipe storage holes and having a meander shape. The cooling pipes vertically adjacent to each other are arranged such that inlets and outlets of the cooling pipes are alternately connected in parallel to a refrigerant inlet and a refrigerant outlet in order to allow a refrigerant to flow in the reverse direction.

10 Claims, 13 Drawing Sheets

FIG.3A
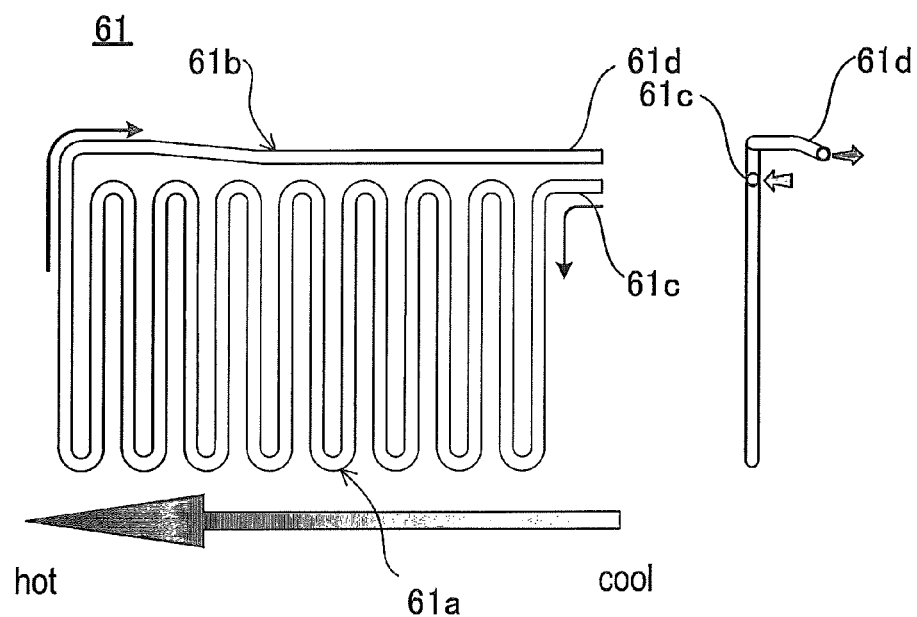
FIG.3B
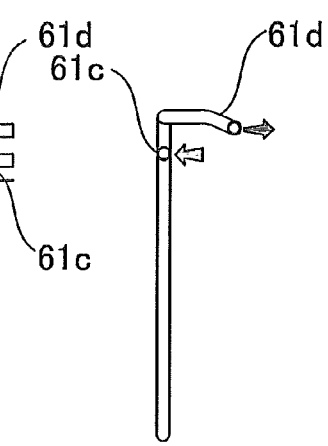
FIG.4A
FIG.4B
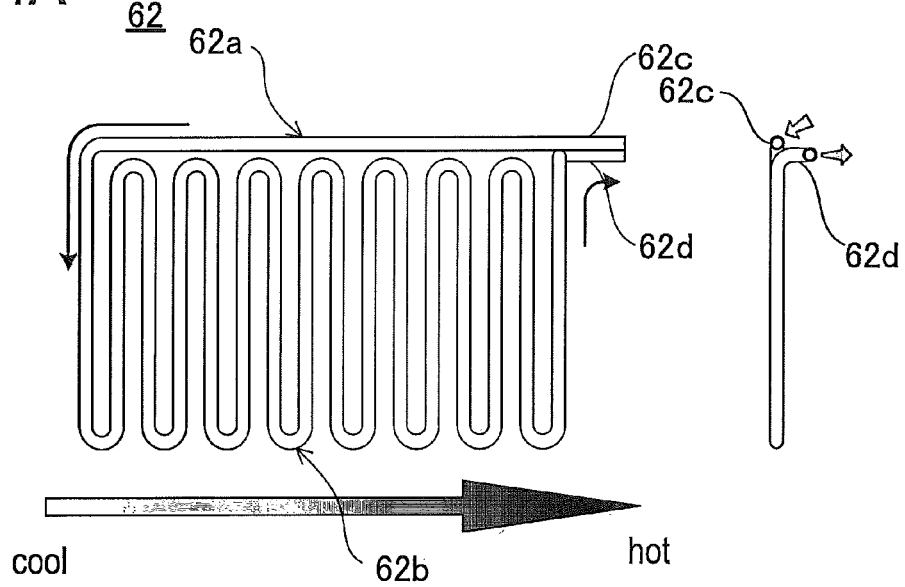

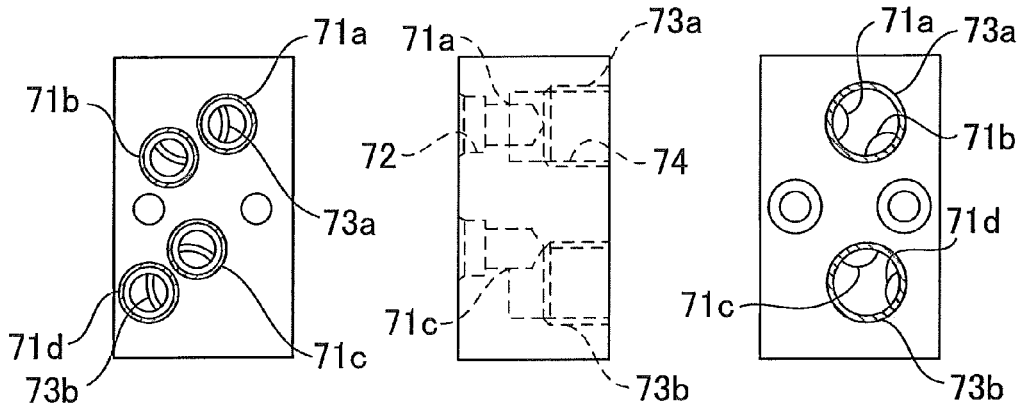
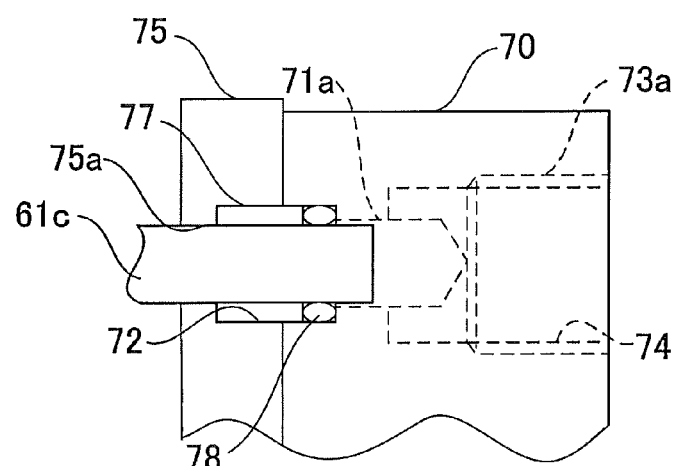

FIG.9A
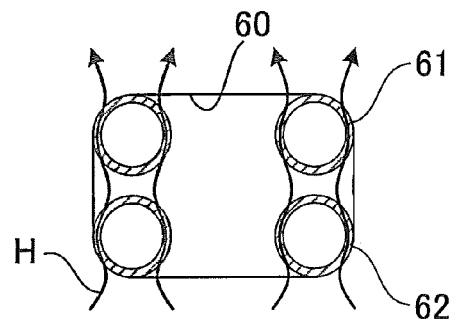
FIG.9B
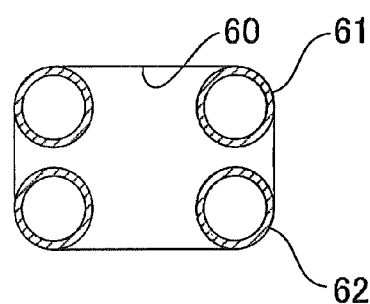
FIG.9C
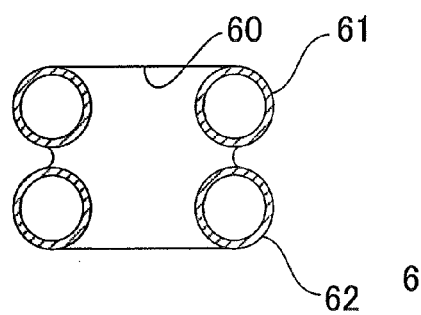
FIG.9D
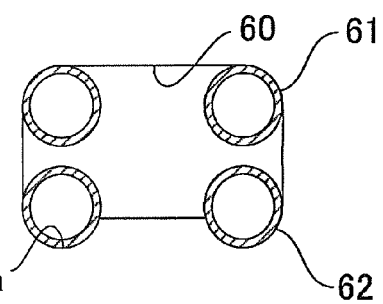
FIG.9E
FIG.9F
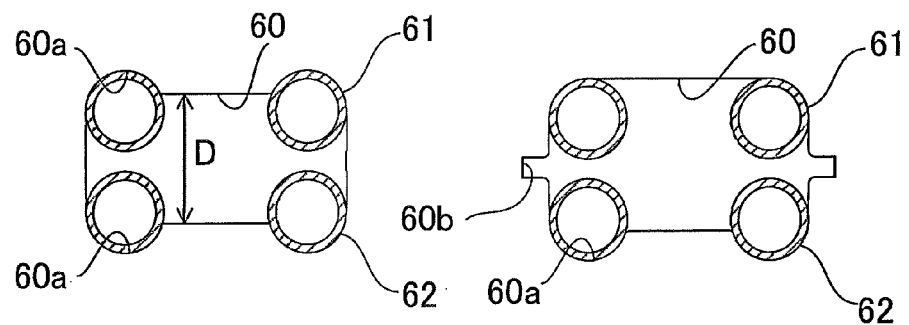

LINEAR MOTOR

CROSS-REFERENCE TO RELATED APPLICATION

This application claims priority to Japanese Application No. 2012-184312, filed Aug. 23, 2012, the entirety of which is incorporated herein by reference.

BACKGROUND

1. Technical Field

The present invention relates to a linear motor that causes a linear motion to an object to be driven using electromagnetic force, and more particularly to a linear motor having a cooling structure.

2. Description of Related Arts

In general, a linear motor includes a field unit having a plurality of permanent magnets which are arranged such that the adjacent polarities are different from each other, and an armature which has a coil arranged opposite to the permanent magnets and which is capable of sliding in a longitudinal direction of the field unit.

In the linear motor, current flows through the coil of the armature so as to cross magnetic flux generated by the permanent magnets of the field unit, whereby driving force is generated on the coil in the longitudinal direction by electromagnetic induction to move the armature.

Since the coil generates heat during the operation of the linear motor, it is necessary to prevent the heat of the coil from being transferred to an object to be driven, such as a processing apparatus arranged on a movable stage. In view of this, a variety of cooling structures for cooling the armature of the linear motor have been developed.

As a technique with respect to cooling an armature of a linear motor, there has been disclosed a linear motor having a cooling passage folded successively in the moving direction of the armature in an intermediate plate which is provided between an armature mounting plate and a table, and in the armature mounting plate (see, for example, Japanese Unexamined Patent Publication No. 2004-304932; hereafter, Patent Document 1). A refrigerant flowing into the cooling passage flows from the intermediate plate and is discharged from the armature mounting plate.

Also, the applicant of the present application has proposed an armature for a linear motor, which is provided with a cooling pipe arranged in a plurality of slots of a core so as to sandwich a coil (see, for example, Japanese Unexamined Patent Publication No. 2008-35698; hereafter, Patent Document 2).

Meanwhile, the linear motor according to Patent Document 1 cools the inside of the slot by the cooling passage formed in the intermediate plate and in the armature mounting plate, whereby cooling efficiency is high.

However, since this linear motor according to Patent Document 1 has a large number of components forming the cooling structure, the production cost is increased, and it is difficult to realize high assembling precision.

In the linear motor according to Patent Document 2, two cooling pipes are arranged in the slot so as to sandwich the coil, whereby cooling efficiency is very high.

However, in the armature for the linear motor according to Patent Document 2, the cooling pipe is long, so the pressure loss of the refrigerant is large. Also, since the cooling pipe is present on the surface opposite to a magnet, it is difficult for a magnetic field of the coil to reach the permanent magnet, whereby the maximum thrust force is decreased. In addition, the cooling pipe in the slot has to be electrically insulated, whereby production cost is increased.

The present invention is made in view of the above circumstances and aims to provide a linear motor that is capable of reducing a pressure loss of a refrigerant, achieving efficient cooling by making a temperature distribution uniform, and increasing maximum thrust force by reducing a magnetic resistance.

SUMMARY

Also, the present invention aims to provide a linear motor that can realizes high precision in assembling a cooling structure and reduce production cost.

In order to attain the foregoing objects, the linear motor according to the present invention includes a field unit having a permanent magnet, as well as an armature provided opposite to the permanent magnet and having a coil.

The armature includes teeth, a core, and a cooling pipe.

The teeth lay out and form a slot for storing the coil. The core connects the teeth and closes the top end of the slot. The plurality of cooling pipes is arranged vertically in the core along the longitudinal direction and has a meander shape.

The cooling pipes vertically adjacent to each other are arranged such that inlets and outlets of the respective cooling pipes are alternately connected in parallel to a refrigerant inlet and a refrigerant outlet, so as to allow the refrigerant to flow in the reverse directions.

In the linear motor according to the present invention, a plurality of cooling pipes having a meander shape is arranged in the core along the longitudinal direction, and these pipes are connected in parallel. Therefore, the linear motor can prevent the increase in the total length of each cooling pipe. And, since the cross-sectional area of the refrigerant flow path can be doubled, the pressure loss of the refrigerant can be reduced.

Also, in the linear motor according to the present invention, the cooling pipes vertically adjacent to each other are arranged such that inlets and outlets of the respective cooling pipes are alternately connected in parallel to a refrigerant inlet and a refrigerant outlet, so as to allow the refrigerant to flow in the reverse directions. Therefore, the temperature distribution of the core can be made uniform, whereby efficient cooling can be realized.

Moreover, in the linear motor according to the present invention, the cooling pipe is mounted to the core. Therefore, the magnetic resistance can be reduced to increase the maximum thrust force, compared to the case in which the cooling pipe is mounted in the slot.

BRIEF DESCRIPTION OF THE DRAWINGS

FIGS. 3A and 3B are a plain view and a right side view of an upper cooling pipe;

FIGS. 4A and 4B are a plain view and a right side view of a lower cooling pipe;

FIGS. 5A to 5C are a left side view, a front view, and a right side view of a manifold;

FIG. 6 is a cross-sectional view of a connection structure between the cooling pipe and the manifold;

FIGS. 9A to 9F are schematic cross-sectional views illustrating arrangement examples of the cooling pipes according to the third embodiment;

DETAILED DESCRIPTION

Linear motors according to the first to seventh embodiments will be described below with reference to the drawings.

In the linear motor according to the first to seventh embodiments, the cooling pipes vertically adjacent to each other are arranged such that inlets and outlets of the respective cooling pipes are alternately connected in parallel to a refrigerant inlet and a refrigerant outlet, so as to allow the refrigerant to flow in the reverse directions. Therefore, the first to seventh embodiments can provide a linear motor that can reduce pressure loss of a refrigerant and can make a temperature distribution of the core uniform, thereby efficient cooling can be realized.

First Embodiment

[Configuration of Linear Motor]

Figure 1:
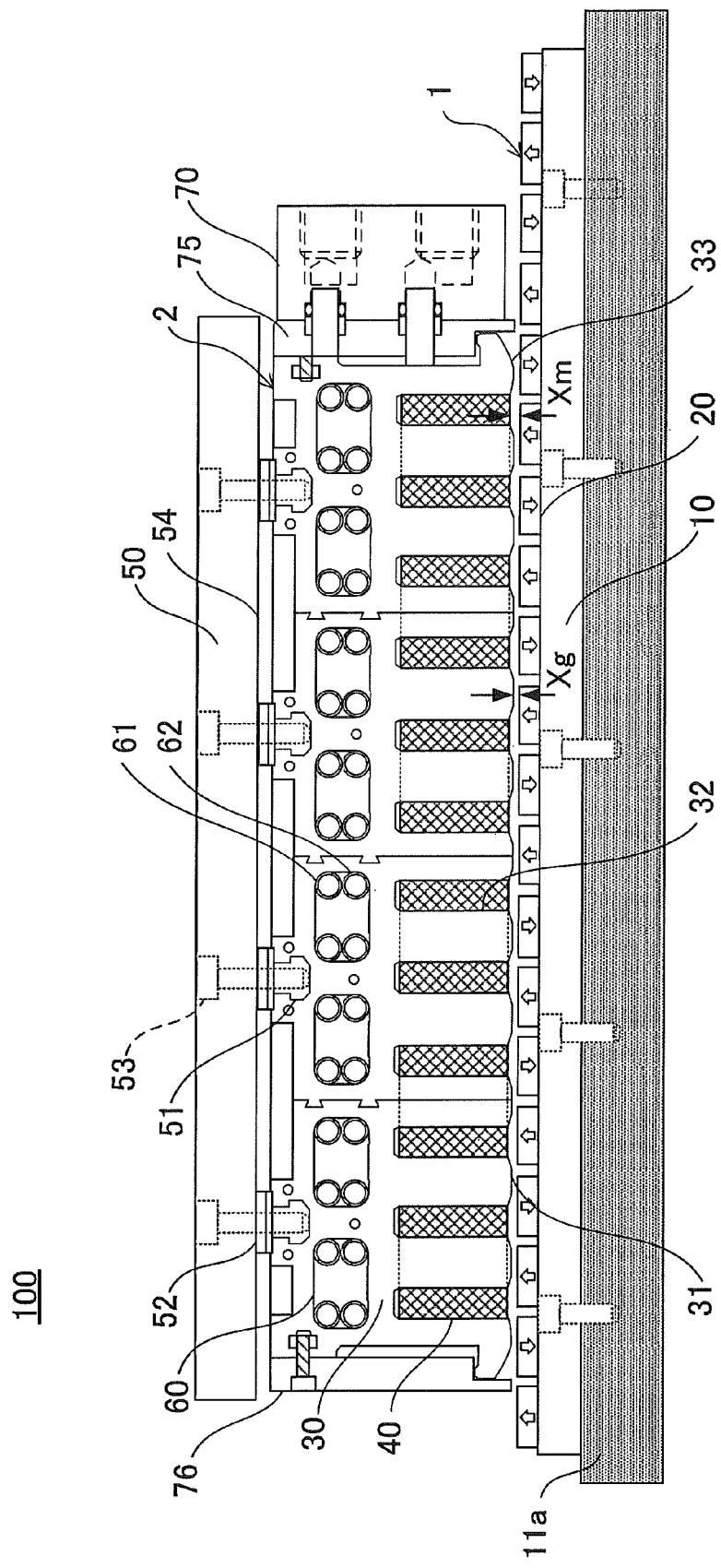
FIG. 1 is a cross-sectional view illustrating a linear motor along a longitudinal direction according to the first embodiment.
Figure 2:
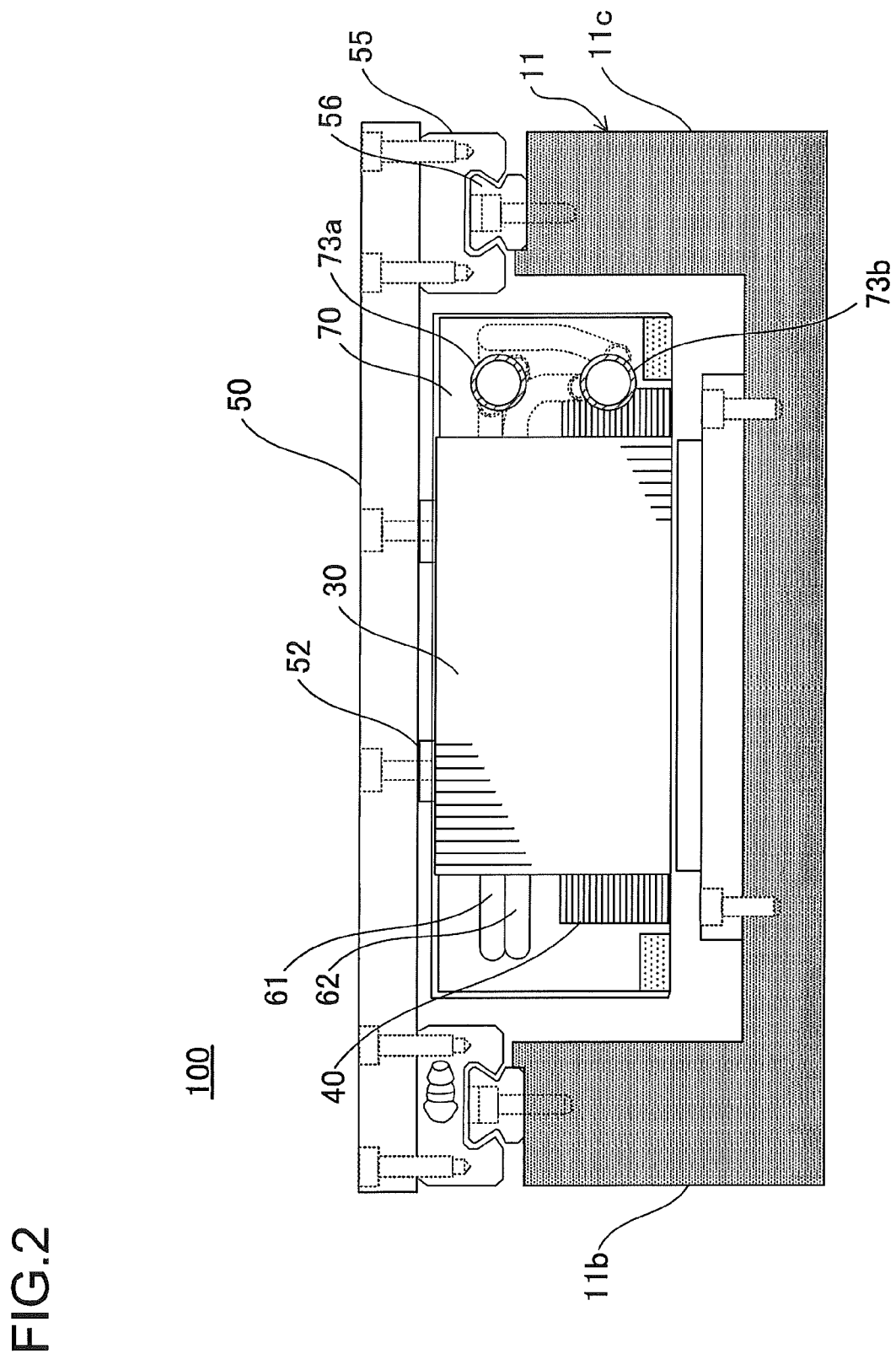
FIG. 2 is aright side view of the linear motor according to the first embodiment.

A configuration of a linear motor according to the first embodiment will firstly be described with reference to FIGS. 1 and 2. FIG. 1 is a cross-sectional view illustrating a linear motor along a longitudinal direction according to the first embodiment. FIG. 2 is a right side view of the linear motor according to the first embodiment.

As illustrated in FIGS. 1 and 2, a linear motor 100 according to the first embodiment includes a field unit 1 and an armature 2.

The field unit 1 includes a yoke 10 and permanent magnets 20.

The yoke 10 is a plate-like magnetic metal member. The yoke 10 is fixed on a bottom 11a of a mounting base 11 having a squared U-shaped cross-section. The field unit 1 functions as a stator.

The yoke 10 has a function of maximizing an electromagnetic induction effect of the permanent magnets 20 by closing a magnetic line directed from the field unit 1 to the mounting base 11. The material of the yoke 10 is, for example, an iron magnetic body such as an SC material, but the material is not limited thereto.

A plurality of the permanent magnets 20 is arranged on the yoke 10 along the longitudinal direction (the movable direction of the linear motor 100) of the yoke 10. The plurality of permanent magnets 20 is arranged with a predetermined space such that the polarities on the surfaces of the adjacent magnets are different from each other (N, S, N, S, . . . ).

The armature 2 includes a core 30, teeth 31, and a coil 40. The armature 2 functions as a movable member.

The core 30 is a member forming the body of the armature 2. A plurality of teeth 31 is projected from the bottom of the core 30 toward the permanent magnets 20. Specifically, the bases of the teeth 31 are coupled by the core 30.

The teeth 31 are a member for forming a slot 32 serving as a space for storing the coil 40. Specifically, the armature 2 has a plurality of concave slots 32 arranged side by side in the longitudinal direction across the teeth 31.

The top of each slot 32 is closed by the core 30, and the bottom thereof is open. The number of the slots 32 corresponds to the number of the coils 40.

The core 30 and the teeth 31 are made of a magnetic steel plate, for example. Since the teeth 31 are a magnetic body, the gap between the teeth surface and the surface of the magnet of the field unit 1 becomes a magnetic gap Xg.

A taper portion 33 is formed on each of the teeth 31 on both ends in the longitudinal direction in order to reduce a cogging (vibration caused by the flux change of the field unit 1 and the teeth 31) during the linear motion.

The coil 40 is wound in oval shape so as to cover the surrounding of the alternate teeth 31. The coil 40 faces the permanent magnet 20 of the field unit 1 with a mechanical gap Xm therebetween.

A movable stage 50 on which an object to be driven such as a processing apparatus is placed, for example, is fixed on the core 30. The movable stage 50 is fixed by screwing a bolt 53 to a T-slot nut 51 buried on the top face of the core 30 through a metal or resin spacer 52 therebetween. Meanwhile, a metal or resin plate cover member 54 is mounted between the spacers 52 and 52.

A channel-like linear guide 55 is fixed using a bolt below both ends of the movable stage 50 in the widthwise direction (the direction orthogonal to the movable direction of the linear motor 100). The linear guide 55 has a downward concave shape and engages with a convex bearing 56 fixed on standing walls 11b and 11c of the mounting base 11 with bolts. The bearing 56 is provided to extend along the longitudinal direction of the standing walls 11b and 11c.

A plurality of cooling pipe storage holes 60 is formed on the core 30. The cooling pipe storage holes 60 penetrates through the core 30 in the widthwise direction. The plurality of cooling pipe storage holes 60 is arranged in parallel in the longitudinal direction of the core 30.

The cross-section of the cooling pipe storage hole 60 has almost a rectangular shape. Specifically, the cross-sectional shape of the cooling pipe storage hole 60 is formed into a rectangle with four arc-like corners. The plurality of cooling pipes is vertically arranged in the cooling pipe storage hole 60. In the first to seventh embodiments, although the cooling pipes 61 and 62 are arranged vertically in the cooling pipe storage hole 60 in a two-tiered manner, the arrangement of the cooling pipe is not limited thereto.

The structure of the cooling pipe in the first embodiment will next be described with reference to FIGS. 3A, 3B, 4A, and 4B. FIG. 3A is a plain view of the upper cooling pipe, and FIG. 3B is a right side view thereof. FIG. 4A is a plain view of the lower cooling pipe, and FIG. 4B is a right side view thereof.

As illustrated in FIGS. 3A, 3B, 4A, and 4B, the cooling pipes 61 and 62 has almost a meander shape or a serpentine shape. The cooling pipes 61 and 62 are made of a metal tube having good thermal conductivity, such as a copper tube, an aluminum tube, or a stainless steel tube.

As illustrated in FIG. 3A, a flow pipe 61a of the upper cooling pipe 61 for refrigerant has a meander shape in a plain view, while a return pipe 61b of the upper cooling pipe 61 has an L-letter shape. On the other hand, as illustrated in FIG. 4A, a flow pipe 62a of the lower cooling pipe 62 is formed into an L-letter shape, while a return pipe 62b is formed to have a meander shape.

As illustrated in FIG. 3B, an inlet 61c of the upper cooling pipe 61 is horizontally bent in an L-letter shape, and an outlet 61d is bent downwardly and horizontally. On the other hand, as illustrated in FIG. 4A, an inlet 62c of the lower cooling pipe 62 is straight, and an outlet 62d is bent downwardly and horizontally. The inlets 61c and 62c and the outlets 61d and 62d of the cooling pipes 61 and 62 are connected to a manifold 70 (see FIGS. 1 and 2).

A manifold structure in the first embodiment will be described with reference to FIGS. 5A, 5B, 5C, and 6. FIGS. 5A, 5B, and 5C are a left side view, a front view, and a right side view of the manifold. FIG. 6 is a cross-sectional view of a connection structure of the cooling pipe and the manifold.

As illustrated in FIG. 5A, inlet connection holes 71a and 71b, and outlet connection holes 71c and 71d for the cooling pipes 61 and 62 are formed on the inner surface of the manifold 70. A large-diameter portion 72 is formed on an open side of the inlet connection holes 71a and 71b and the outlet connection holes 71c and 71d.

As illustrated in FIG. 5C, a refrigerant inlet 73a and a refrigerant outlet 73b are opened on the outer surface of the manifold 70. A female screw 74 such as a taper screw or a straight screw for connecting a refrigerant supply pipe and a refrigerant exhaust pipe, each of which are not illustrated, is formed on an inner diameter portion of the refrigerant inlet 73a and the refrigerant outlet 73b. Meanwhile, the refrigerant inlet 73a is connected to an unillustrated refrigerant supply system. The refrigerant outlet 73b is connected to an unillustrated refrigerant exhaust system.

As illustrated in FIG. 5B, in the manifold 70, the refrigerant inlet 73a communicates with the inlet connection holes 71a and 71b, and the refrigerant outlet 73b communicates with the outlet connection holes 71c and 71d.

As illustrated in FIG. 1, plate-like support members 75 and 76 are mounted on both side faces of the core 30. The support member 75 is formed with a through-hole 75a, and the surrounding portion of the inlets 61c and 62c and the outlets 61d and 62d of the cooling pipes 61 and 62 are supported by the through-hole 75a of the support member 75. The outer surface of the support member 75 is brought into contact with the inner surface of the manifold 70.

A positioning ring 77 is mounted around the cooling pipes 61 and 62 on the outer surface of the through-hole 75a of the support member 75. As illustrated in FIG. 6, when the inlet 61c of the cooling pipe 61 is connected to the inlet connection hole 71a of the manifold 70, the positioning ring 77 is mounted in the annular large-diameter portion 72 through an O-ring 78. Although not illustrated, the cooling pipes 61 and 62 are connected by the same structure for the inlet connection hole 71b and the outlet connection holes 71c and 71d of the manifold 70.

Referring again to FIGS. 1 and 2, the meander flow pipe 61a of the upper cooling pipe 61 and the meander return pipe 62a of the lower cooling pipe 62 are stored in the cooling pipe storage hole 60.

The arrangement of the cooling pipes in the cooling pipe storage hole will next be described with reference to FIGS. 7A to 7D. FIGS. 7A to 7D are schematic cross-sectional views illustrating examples of the arrangement of the cooling pipes according to the first embodiment.

As illustrated in FIGS. 7A to 7D, according to the first embodiment, the upper cooling pipe 61 and the lower cooling pipe 62 are in contact with each other within the cooling pipe storage hole 60.

Figure 7A:
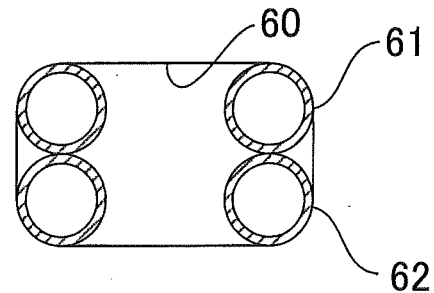
FIGS. 7A to 7D are schematic cross-sectional views illustrating arrangement examples of the cooling pipes according to the first embodiment.

The cross-sectional shape of the cooling pipe storage hole 60 illustrated in FIG. 7A is almost a rectangle with four arc-like corners. In this rectangular cooling pipe storage hole 60, the upper and lower cooling pipes 61 and 62 are arranged to be in contact with each other.

Figure 7B:
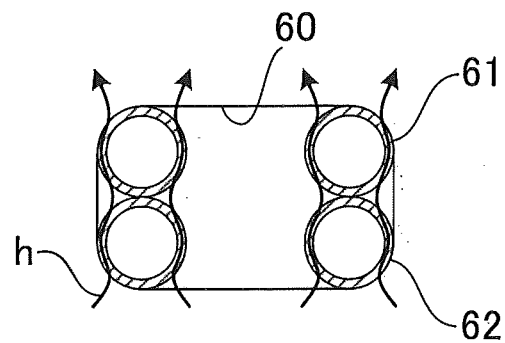

An arrow h in FIG. 7B indicates an image of a heat transfer when the upper and lower cooling pipes 61 and 62 are brought into contact with each other. The copper cooling pipes 61 and 62 easily transfer heat to a refrigerant to attain effective cooling, but they easily transfer heat to the movable stage 50 as well.

Figure 7C:
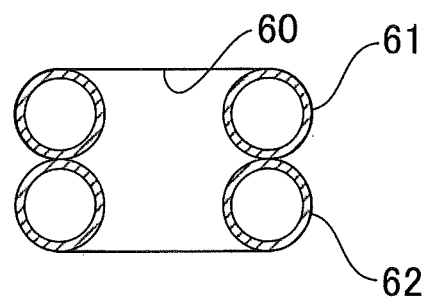

The cooling pipe storage hole 60 illustrated in FIG. 7C has a cross-sectional shape of two laterally elongated holes being continuously arranged vertically. In this continuously arranged hole, the upper and lower cooling pipes 61 and 62 are arranged in contact with each other. In the arrangement example in FIG. 7C, the contact area between the cooling pipes 61, 62 and the magnetic steel plate of the core 30 increases at the double arc-like portions on both side faces of the cooling pipe storage hole 60.

Figure 7D:
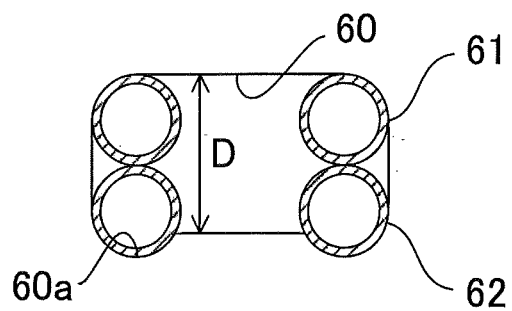

The cross-sectional shape of the cooling pipe storage hole 60 illustrated in FIG. 7D is almost a rectangle having four arc-like corners and arc-like concave portions 60a on its both lower ends. In the cooling pipe storage hole 60 having the arc-like concave portions 60a on both lower ends, the upper and lower cooling pipes 61 and 62 are arranged in contact with each other.

In the arrangement example of FIG. 7D, the arc-like concave portions 60a are formed on both lower ends of the cooling pipe storage hole 60, whereby heat of the coil 40 is absorbed easily. In the arrangement example of FIG. 7D, the space D on the center of the cooling pipe storage hole 60 is formed smaller than the total outer diameter of the cooling pipes 61 and 62. Therefore, the cooling pipes 61 and 62 are easily assembled by mounting the lower cooling pipe 62 first, and mounting the upper cooling pipe 61 next.

[Operation of Linear Motor]

An operation of the linear motor 100 according to the first embodiment will next be described with reference to FIGS. 1 to 7D.

As illustrated in FIG. 1, the field unit 1 of the linear motor 100 according to the first embodiment includes a plurality of permanent magnets 20 such that the adjacent polarities are different in the longitudinal direction (N, S, N, S, ... ). The armature 2 has the plurality of coils 40 arranged in the longitudinal direction so as to face the permanent magnets 20 of the field unit 1.

The field unit 1 functions as a stator, and the armature 2 functions as a movable member. Specifically, in the linear motor 100 according to the present embodiment, current flows through the coil 40 of the armature 2 to cross the magnetic flux generated by the permanent magnets 20 of the field unit 1. When the magnetic flux of the permanent magnet 20 and the current flowing through the coil 40 of the armature 2 cross each other, the linear motor 100 according to the present embodiment generates driving force in the longitudinal direction onto the coil 40 by the electromagnetic induction, thereby the armature 2 is moved in the longitudinal direction.

The concave linear guides 55 are fixed on both lower ends of the movable stage 50 in the widthwise direction, and the linear guides 55 are engaged with the bearings 56 fixed on the standing walls 11*b* and 11*c* of the mounting base 11. The movable stage 50 is guided along the bearings 56 by the linear guides 55.

Therefore, an object to be driven (application), such as a processing apparatus, placed on the movable stage 50 of the armature 2 smoothly moves along the longitudinal direction together with the movable stage 50.

Since the coil 40 generates heat during the operation of the linear motor 100, it is necessary to prevent heat of the coil from being transferred to the apparatus arranged on the movable stage 50. In view of this, the linear motor 100 according to the present embodiment is provided with the cooling structure for cooling the armature 2.

The linear motor 100 according to the present embodiment includes a plurality of cooling pipe storage holes 60 in the core 30 along the longitudinal direction. Two cooling pipes 61 and 62, having almost a meander shape, are arranged vertically in the cooling pipe storage hole 60.

The upper cooling pipe 61 and the lower cooling pipe 62 are arranged such that the inlets 61*c* and 62*c* and the outlets 61*d* and 62*d* of the cooling pipes 61 and 62 are alternately connected in parallel to the refrigerant inlet 73*a* and the refrigerant outlet 73*b*, in order that the flow directions of the refrigerant by the manifold 70 are reverse to each other. With this structure, the refrigerant flows separately. Since the upper cooling pipe 61 and the lower cooling pipe 62 are vertically arranged in parallel, the total length of the cooling pipe can be decreased by half. Accordingly, the pressure loss is equal to or less than ¼ of the pressure loss in the case where the cooling pipes are arranged in series.

The refrigerant flows from the reverse directions in the upper cooling pipe 61 and the lower cooling pipe 62 via the manifold 70. Since the refrigerant flows from the reverse directions in the upper cooling pipe 61 and the lower cooling pipe 62, a uniform temperature distribution is realized on the whole core 30, whereby the heat of the coil 40 can be efficiently cooled.

The linear motor 100 according to the present embodiment can reduce pressure loss of the refrigerant and can make the temperature distribution of the core 30 uniform, thereby efficient cooling of the heat from coil 40 can be realized.

As illustrated in the plain view of FIG. 3A, the flow pipe 61*a* of upper cooling pipe 61 for the refrigerant has the meander shape, while the return pipe 61*b* has the L-letter shape. On the other hand, as illustrated in a plain view of FIG. 4A, the flow pipe 62*a* of the lower cooling pipe 62 is formed into an L-letter shape, while the return pipe 62*b* is formed into a meander shape.

Accordingly, even though the refrigerant flows in the reverse directions, since the structures of the cooling pipes 61 and 62 can be formed almost the same, the cooling pipes 61 and 62 can be stored vertically in the same cooling pipe storage hole 60. The structure to flow the refrigerant in the reverse directions into the upper cooling pipe 61 and the lower cooling pipe 62 can easily be realized by the function of the manifold 70.

The linear motor 100 according to the present embodiment can provide an effect of assembling the cooling structure with high precision and can reduce a production cost.

In the first embodiment, the upper cooling pipe 61 and the lower cooling pipe 62 are in contact with each other in the cooling pipe storage hole 60 as illustrated in FIGS. 1 to 7D. The arrangement of the cooling pipes 61 and 62 in the first embodiment can enhance cooling efficiency by increasing the contact area of the lower cooling pipe 62 to which the heat from the coil 40 is easily transferred.

As in the arrangement example of FIG. 7D, by forming the arc-like concave portion on both lower ends of the cooling pipe storage hole 60, and by storing the lower cooling pipe 62 in the arc-like concave portion, the heat from the coil 40 is easily absorbed.

In the linear motor 100 according to the present embodiment, the cooling pipe storage hole 60 storing the cooling pipes 61 and 62 is formed on the core 30. Therefore, the magnetic resistance can be reduced, and maximum thrust force can be increased, compared to the case where the cooling pipe is arranged in the slot 32.

Second Embodiment

Next, the second embodiment will be described with reference to FIGS. 8A to 8D. FIGS. 8A to 8D are schematic cross-sectional views illustrating an example of an arrangement of the cooling pipes according to the second embodiment. The components same as those in the linear motor 100 in the first embodiment are identified by the same numerals, and the description will be omitted.

As illustrated in FIGS. 8A to 8D, the arrangement of the cooling pipes 61 and 62 in the second embodiment is different from that in the first embodiment.

In the arrangement example of the second embodiment, the upper cooling pipe 61 and the lower cooling pipe 62 are in contact with each other in the cooling pipe storage hole 60, and a heat transfer material 81 having high heat conductivity is provided in a space between the cooling pipes 61 and 62. As a material for the heat transfer material 81, a material with high heat conductivity including copper, aluminum, and graphite etc. can be employed.

The cooling pipe storage holes 60 in FIGS. 8A to 8D are formed to have a substantially rectangular cross-section with four arc-like corners.

Figure 8A:
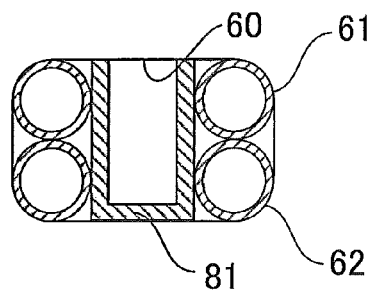
FIGS. 8A to 8E are schematic cross-sectional views illustrating arrangement examples of the cooling pipes according to the second embodiment.

In the arrangement example of FIG. 8A, the heat transfer material 81 with a cross-section of squared C-letter shape is formed in the space between the cooling pipes 61 and 62. The formation of the heat transfer material 81 with the cross-section of the reversed C-letter shape in the space between the cooling pipes 61 and 62 enhances heat-transfer efficiency to the refrigerant.

Figure 8B:
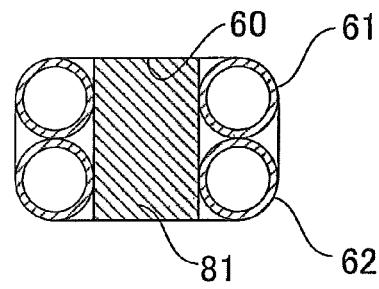

In the arrangement example of FIG. 8B, a heat transfer material 81 having a shape of a square pole is provided in the space between the cooling pipes 61 and 62. The heat transfer material 81 having the shape of a square pole in FIG. 8B more easily transfers heat to the refrigerant than the heat transfer material 81 with the cross-section of the reversed C-letter shape in FIG. 8A.

Figure 8C:
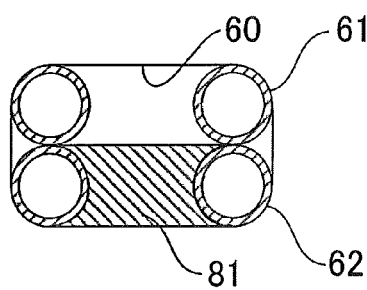

In the arrangement example of FIG. 8C, a heat transfer material 81 with a cotyloid cross-section is provided in the space between the lower cooling pipes 62. The heat transfer material 81 with the cotyloid cross-section on the lower part of the cooling pipe storage hole in FIG. 8C enhances heat-transfer efficiency of the lower cooling pipe 62 to the refrigerant.

Figure 8D:
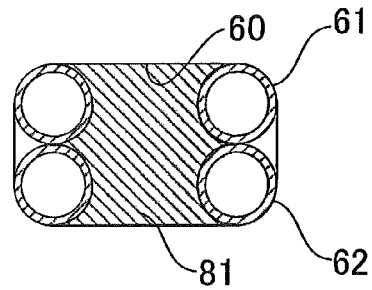

In the arrangement example of FIG. 8D, a heat transfer material 81 with a cross-section of a double cotyloid shape is provided in the space between the cooling pipes 61 and 62. The heat transfer material 81 with the cross-section of the double cotyloid in FIG. 8D enhances not only the heat-transfer efficiency of the lower cooling pipe 62 but also the heat-transfer efficiency of the upper cooling pipe 61 to the refrigerant.

Figure 8E:
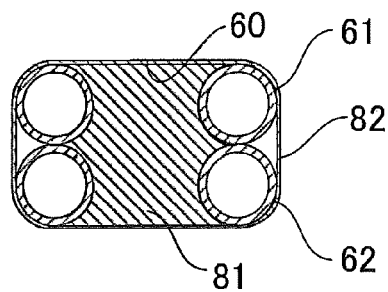

In the arrangement example of FIG. 8E, a heat transfer material 81 with a cross-section of a double cotyloid shape is provided in the space between the cooling pipes 61 and 62. In addition, the surrounding of the cooling pipes 61 and 62 including the heat transfer material 81 is enclosed by a thermal conductive sheet 82, and the thermal conductive sheet 82 is in contact with the inner surface of the cooling pipe storage hole 60. In the arrangement example of FIG. 8E, the surrounding of the cooling pipes 61 and 62 including the heat transfer material 81 is enclosed by the thermal conductive sheet 82, whereby the heat-transfer efficiency to the refrigerant is very excellent.

The second embodiment basically has the same function and effect as those of the first embodiment. Since the heat transfer material 81 having high heat conductivity is provided in the cooling pipe storage hole 60, the second embodiment has a unique effect of being capable of absorbing the heat generated from the coil 40 to the refrigerant efficiently.

Third Embodiment

Next, a third embodiment will be described with reference to FIGS. 9A to 9F. FIGS. 9A to 9F are schematic cross-sectional views illustrating an example of an arrangement of the cooling pipes according to the third embodiment. The components same as those in the linear motor 100 in the first embodiment are identified by the same numerals, and the description will be omitted.

As illustrated in FIGS. 9A to 9F, the arrangement of the cooling pipes 61 and 62 in the third embodiment is different from that in the first embodiment.

As described with reference to FIG. 7B, the cooling pipes 61 and 62 easily transfers heat to the refrigerant to attain effective cooling when they are brought into contact with each other, but they also easily transfer heat to the movable stage 50. In order to prevent the heat transfer to the movable stage 50, the upper cooling pipe 61 and the lower cooling pipe 62 are arranged to be separate from each other within the cooling pipe storage hole 60 in the arrangement according to the third embodiment.

An arrow H in FIG. 9A indicates an image of a heat transfer when the upper cooling pipe 61 and the lower cooling pipe 62 are separated from each other. When the upper and lower cooling pipes 61 and 62 are separated from each other, it is difficult for the heat from the lower cooling pipe 62 to be transferred to the upper cooling pipe 61.

The cooling pipe storage hole 60 in FIG. 9B is formed to have a substantially rectangular cross-sectional shape with four arc-like corners. The upper and lower cooling pipes 61 and 62 are arranged to be separate from each other in the substantially rectangular cooling pipe storage hole 60.

The cooling pipe storage hole 60 illustrated in FIG. 9C has a cross-sectional shape of two laterally elongated holes being continuously arranged vertically. The upper and lower cooling pipes 61 and 62 are arranged to be separate from each other in the cooling pipe storage hole 60 having a shape of two elongated holes being continuously arranged vertically. In the arrangement example of FIG. 9C, the contact area between the cooling pipes 61 and 62 and the magnetic steel plate of the core 30 increases at the double arc-like portions on both side faces of the cooling pipe storage hole 60.

The cross-section of the cooling pipe storage hole 60 illustrated in FIG. 9D is almost a rectangle having four arc-like corners and arc-like concave portions 60a on its both lower ends. The upper and lower cooling pipes 61 and 62 are arranged to be separate from each other in the cooling pipe storage hole 60 having the arc-like concave portions 60a on both lower ends.

In the arrangement in FIG. 9D, the arc-like concave portions 60a are formed on both lower ends of the cooling pipe storage hole 60, whereby heat of the coil 40 is easily absorbed.

The cross-section of the cooling pipe storage hole 60 illustrated in FIG. 9E is almost a rectangle having four arc-like corners and arc-like concave portions 60a at both of the upper ends and at both of the lower ends. The upper and lower cooling pipes 61 and 62 are arranged to be separate from each other in the cooling pipe storage hole 60 having the arc-like concave portions 60a on both upper ends and on both lower ends.

In the arrangement in FIG. 9E, the arc-like concave portions 60a are formed on both upper ends and on both lower ends of the cooling pipe storage hole 60, whereby heat on the coil 40 and heat on the movable stage 50 is easily absorbed. In the arrangement in FIG. 9E, the space D on the center of the cooling pipe storage hole 60 is formed smaller than the total outer diameter of the cooling pipes 61 and 62. Therefore, the cooling pipes 61 and 62 are easily assembled by mounting the lower cooling pipe 62 first and mounting the upper cooling pipe 61 next.

The cross-sectional shape of the cooling pipe storage hole 60 illustrated in FIG. 9F is almost a rectangle having four arc-like corners, arc-like concave portions 60a on both of the lower ends, and projecting concave portions 60b on both of the side faces. The upper and lower cooling pipes 61 and 62 are arranged to be separate from each other in the cooling pipe storage hole 60 having the arc-like concave portions 60a on both lower ends and the projecting concave portions 60b on both of the side faces.

The third embodiment basically has the same function and effect as those of the first embodiment. In particular, the upper cooling pipe 61 and the lower cooling pipe 62 are separated from each other in the third embodiment. Accordingly, the third embodiment has a unique effect of preventing the heat transfer to the movable stage 50, thereby being capable of further preventing the temperature rise of the apparatus.

Fourth Embodiment

Next, the fourth embodiment will be described with reference to FIGS. 10A to 10E. FIGS. 10A to 10E are schematic cross-sectional views illustrating examples of the arrangement of the cooling pipes according to the fourth embodiment. The components same as those in the linear motor 100 in the first embodiment are identified by the same numerals, and the description will be omitted.

As illustrated in FIGS. 10A to 10E, the arrangement of the cooling pipes 61 and 62 in the fourth embodiment is different from that in the first embodiment. Specifically, a heat insulating material 83 is further provided in the arrangement examples of the cooling pipes 61 and 62 according to the third embodiment.

In the arrangement according to the fourth embodiment, the upper cooling pipe 61 and the lower cooling pipe 62 are arranged to be separate from each other in the cooling pipe storage hole 60, and a sheet-like heat insulating material 83 is provided between the cooling pipes 61 and 62. Examples of the material for the heat insulating material 83 include a urethane foam, synthetic resin, or glass wool, each of which have low heat conductivity.

Figure 10A:
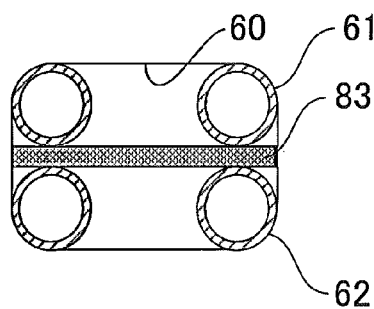
FIGS. 10A to 10E are schematic cross-sectional views illustrating arrangement examples of the cooling pipes according to the fourth embodiment.

The cooling pipe storage hole 60 in FIG. 10A is formed to have a substantially rectangular cross-sectional shape with four arc-like corners. The upper and lower cooling pipes 61 and 62 are arranged to be separate from each other in the substantially rectangular cooling pipe storage hole 60, and the plate-like heat insulating material 83 is provided between the cooling pipes 61 and 62.

Figure 10B:
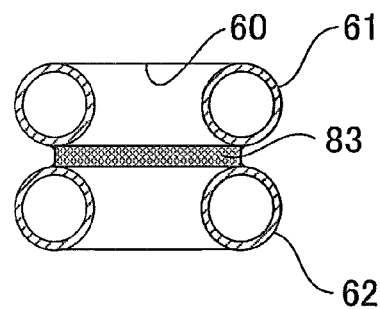

The cooling pipe storage hole 60 illustrated in FIG. 10B has a cross-sectional shape of two lateral elongated holes being continuously arranged vertically. The upper and lower cooling pipes 61 and 62 are arranged to be separate from each other in the cooling pipe storage hole 60 having a shape of two elongated holes being arranged vertically, wherein the plate-like heat insulating material 83 is provided between the cooling pipes 61 and 62. In the arrangement example of FIG. 10B, the contact area between the cooling pipes 61 and 62 and the magnetic steel plate of the core 30 increases at the double arc-like portions on both side faces of the cooling pipe storage hole 60.

Figure 10C:
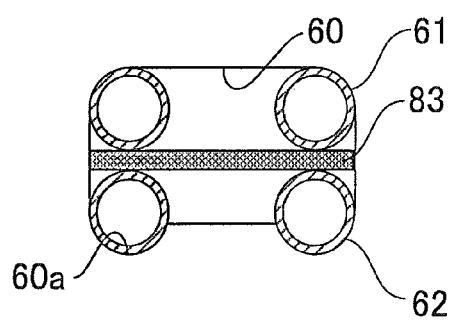

The cross-section of the cooling pipe storage hole 60 illustrated in FIG. 10C is almost a rectangle having four arc-like corners and arc-like concave portions 60a on both of the lower ends. The upper and lower cooling pipes 61 and 62 are arranged to be separate from each other in the cooling pipe storage hole 60 having the arc-like concave portions 60a on both lower ends, and the plate-like heat insulating material 83 is provided between the cooling pipes 61 and 62.

In the arrangement example of FIG. 10C, the arc-like concave portions 60a are formed on both of the lower ends of the cooling pipe storage hole 60, whereby heat of the coil 40 is easily absorbed.

Figure 10D:
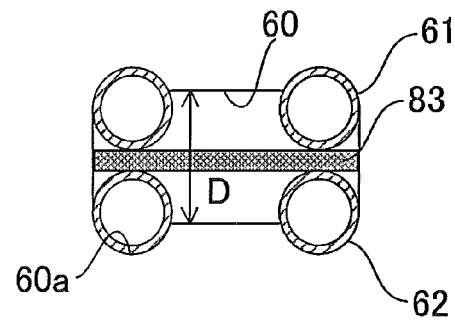

The cross-section of the cooling pipe storage hole 60 illustrated in FIG. 10D is almost a rectangle having four arc-like corners and arc-like concave portions 60a on both of the upper ends and on both of the lower ends. The upper and lower cooling pipes 61 and 62 are arranged to be separate from each other in the cooling pipe storage hole 60 having the arc-like concave portions 60a on both upper ends and on both lower ends, and the plate-like heat insulating material 83 is provided between the cooling pipes 61 and 62.

In the arrangement of FIG. 10D, the arc-like concave portions 60a are formed on both of the upper ends and on both of the lower ends of the cooling pipe storage hole 60, whereby heat on the coil 40 and heat on the movable stage 50 is easily absorbed. In the arrangement example of FIG. 10D, the space D on the center of the cooling pipe storage hole 60 is formed smaller than the total outer diameter of the cooling pipes 61 and 62. Therefore, the cooling pipes 61 and 62 are easily assembled by mounting the lower cooling pipe 62 first, and mounting the upper cooling pipe 61 next.

Figure 10E:
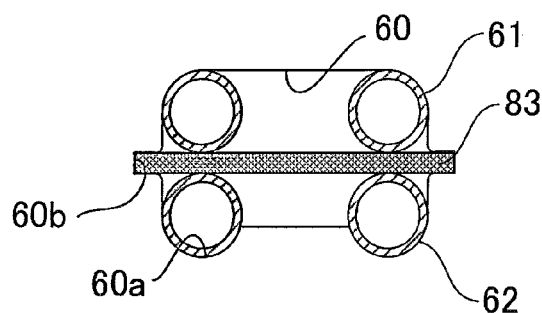

The cross-sectional shape of the cooling pipe storage hole 60 illustrated in FIG. 10E is almost a rectangle having four arc-like corners, arc-like concave portions 60a on both of the lower ends, and projecting concave portions 60b on both of the side faces. The upper and lower cooling pipes 61 and 62 are arranged to be separate from each other in the cooling pipe storage hole 60 having the arc-like concave portions 60a on both lower ends and the projecting concave portions 60b on both side faces, and the plate-like heat insulating material 83 is provided between the cooling pipes 61 and 62.

The fourth embodiment basically has the same function and effect as those of the first embodiment. In the fourth embodiment, the upper cooling pipe 61 and the lower cooling pipe 62 are separated from each other, and the heat insulating material 83 is provided between the cooling pipes 61 and 62. Accordingly, the fourth embodiment has a unique effect of preventing the heat transfer to the movable stage 50, thereby being capable of further preventing the temperature rise of the apparatus.

Fifth Embodiment

Next, the fifth embodiment will be described with reference to FIGS. 11A to 11F. FIGS. 11A to 11F are schematic cross-sectional views illustrating an example of an arrangement of the cooling pipes according to the fifth embodiment. The components same as those in the linear motor 100 in the first embodiment are identified by the same numerals, and the description will be omitted.

As illustrated in FIGS. 11A to 11F, the arrangement of the cooling pipes 61 and 62 in the fifth embodiment is different from that in the first embodiment. Specifically, a heat transfer material 81 is further provided in the arrangement examples of the cooling pipes 61 and 62 according to the fourth embodiment.

In the arrangement example according to the fifth embodiment, the upper cooling pipe 61 and the lower cooling pipe 62 are arranged to be separate from each other in the cooling pipe storage hole 60, and a plate-like heat insulating material 83 is provided between the cooling pipes 61 and 62. In addition, a heat transfer material 81 is provided between the cooling pipes 61 and 61 and between the cooling pipes 62 and 62 in the arrangement example of the fifth embodiment. Materials having low heat conductivity illustrated in the fourth embodiment are employed as the heat insulating material 83. Materials having high heat conductivity illustrated in the second embodiment are employed as the heat transfer material 81.

Figure 11A:
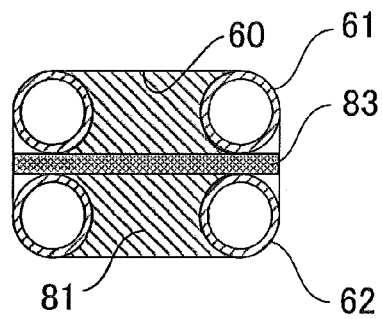
FIGS. 11A to 11F are schematic cross-sectional views illustrating arrangement examples of the cooling pipes according to the fifth embodiment.

The cross-sectional shape of the cooling pipe storage hole 60 illustrated in FIG. 11A is almost a rectangle with four arc-like corners. The upper and lower cooling pipes 61 and 62 are arranged to be separate from each other in the substantially rectangular cooling pipe storage hole 60, and the plate-like heat insulating material 83 is provided between the cooling pipes 61 and 62. In addition, a heat transfer material 81 with a cotyloid cross-section is provided between the cooling pipes 61 and 61 as well as between the cooling pipes 62 and 62.

Figure 11B:
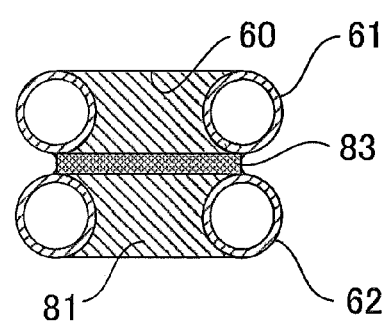

The cooling pipe storage hole 60 illustrated in FIG. 11B has a cross-section of two lateral elongated holes being continuously arranged vertically. The upper and lower cooling pipes 61 and 62 are arranged to be separate from each other in the cooling pipe storage hole 60 having a shape of two elongated holes being continuously arranged vertically, wherein the plate-like heat insulating material 83 is provided between the cooling pipes 61 and 62. In addition, a heat transfer material 81 with a cotyloid cross-section is provided between the cooling pipes 61 and 61 as well as between the cooling pipes 62 and 62.

In the arrangement example of FIG. 11B, the contact area between the cooling pipes 61 and 62 and the magnetic steel sheet of the core 30 increases on the double arc-like portions on both side faces of the cooling pipe storage hole 60.

Figure 11C:
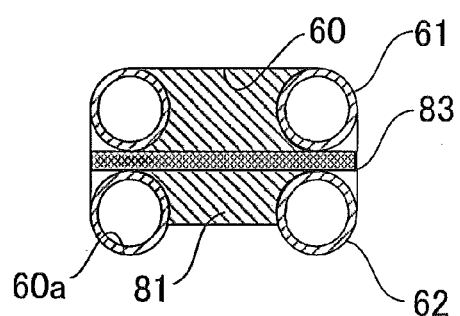

The cross-sectional shape of the cooling pipe storage hole 60 illustrated in FIG. 11C is almost a rectangle having four arc-like corners and arc-like concave portions 60a on both of the lower ends. The upper and lower cooling pipes 61 and 62 are arranged to be separate from each other in the cooling pipe storage hole 60 having the arc-like concave portions 60a on both lower ends, and the plate-like heat insulating material 83 is provided between the cooling pipes 61 and 62. In addition, a heat transfer material 81 with a cotyloid cross-section is provided between the cooling pipes 61 and 61 as well as between the cooling pipes 62 and 62.

In the arrangement example of FIG. 11C, the arc-like concave portions 60a are formed on both of the lower ends of the cooling pipe storage hole 60, whereby heat of the coil 40 is easily absorbed.

Figure 11D:
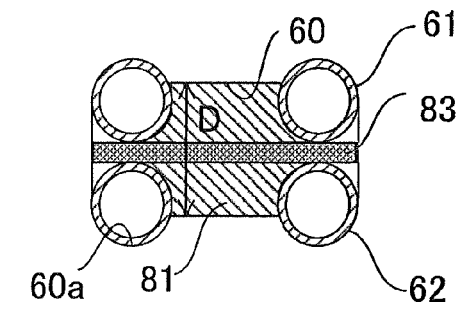

The cross-sectional shape of the cooling pipe storage hole 60 illustrated in FIG. 11D is almost a rectangle having four arc-like corners and arc-like concave portions 60a on both of the upper ends and on both of the lower ends. The upper and lower cooling pipes 61 and 62 are arranged to be separate from each other in the cooling pipe storage hole 60 having the arc-like concave portions 60a on both upper ends and on both lower ends, and the plate-like heat insulating material 83 is provided between the cooling pipes 61 and 62. In addition, a heat transfer material 81 with a cotyloid cross-sectional shape is provided between the cooling pipes 61 and 61 as well as between the cooling pipes 62 and 62.

In the arrangement example of FIG. 11D, the arc-like concave portions 60a are formed on both of the upper ends and on both of the lower ends of the cooling pipe storage hole 60, whereby heat on the coil 40 and heat on the movable stage 50 is easily absorbed. In the arrangement example of FIG. 11D, the space D on the center of the cooling pipe storage hole 60 is formed smaller than the total outer diameter of the cooling pipes 61 and 62. The lower cooling pipe 62 is mounted first, the upper cooling pipe 61 is mounted next, and then, the heat insulating material 83 is provided between the cooling pipes 61 and 62. Thereby, the assembling operation can be performed easily. It is preferable that the heat transfer material 81 is preliminarily provided between the cooling pipes 61 and 61 as well as between the cooling pipes 62 and 62.

Figure 11E:
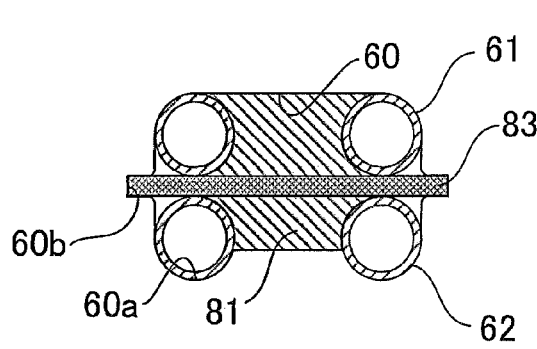

The cross-sectional shape of the cooling pipe storage hole 60 illustrated in FIG. 11E is almost a rectangle having four arc-like corners, arc-like concave portions 60a on both of the lower ends, and projecting concave portions 60b on both of the side faces. The upper and lower cooling pipes 61 and 62 are arranged to be separate from each other in the cooling pipe storage hole 60 having the arc-like concave portions 60a on both lower ends and the projecting concave portions 60b on both side faces, and the plate-like heat insulating material 83 is provided between the cooling pipes 61 and 62. In addition, a heat transfer material 81 with a cotyloid cross-section is provided between the cooling pipes 61 and 61 as well as between the cooling pipes 62 and 62.

Figure 11F:
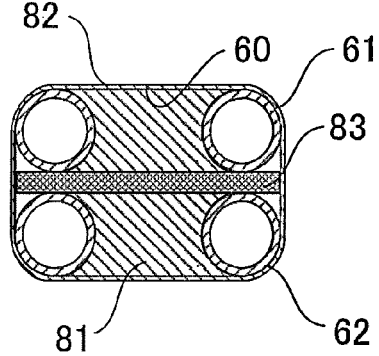

The cross-sectional shape of the cooling pipe storage hole 60 illustrated in FIG. 11F is almost a rectangle with four arc-like corners. The upper and lower cooling pipes 61 and 62 are arranged to be separate from each other in the substantially rectangular cooling pipe storage hole 60, and the plate-like heat insulating material 83 is provided between the cooling pipes 61 and 62. In addition, a heat transfer material 81 with a cotyloid cross-section is provided between the cooling pipes 61 and 61 as well as between the cooling pipes 62 and 62.

In addition, the surrounding of the cooling pipes 61 and 62 including the heat insulating material 83 and the heat transfer material 81 is enclosed by a thermal conductive sheet 82, and the thermal conductive sheet 82 is in contact with the inner surface of the cooling pipe storage hole 60. In the arrangement example of FIG. 11F, the surrounding of the cooling pipes 61 and 62 including the heat insulating material 83 and the heat transfer material 81 is enclosed by the thermal conductive sheet 82, whereby the heat-transfer efficiency to the refrigerant is very excellent.

The fifth embodiment basically has the same function and effect as those of the first embodiment. In the fifth embodiment, the upper cooling pipe 61 and the lower cooling pipe 62 are separated from each other, the heat insulating material 83 is provided between the cooling pipes 61 and 62, and the heat transfer material 81 is provided between the cooling pipes 61 and 61 as well as between the cooling pipes 62 and 62. Accordingly, the fifth embodiment has a unique effect of allowing the refrigerant to efficiently absorb the heat generated from the coil 40 and preventing the heat transfer to the movable stage 50, thereby being capable of further preventing the temperature rise of the apparatus.

Sixth Embodiment

Figure 12:
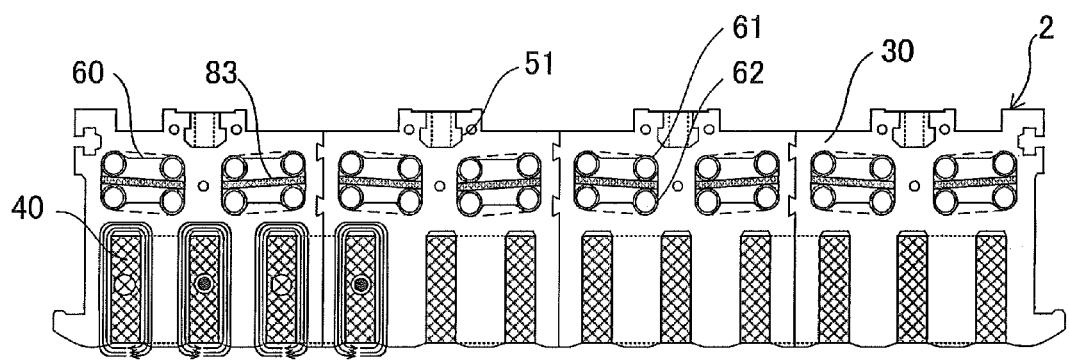
FIG. 12 is a schematic cross-sectional view of an armature according to the sixth embodiment.
Figure 13A:
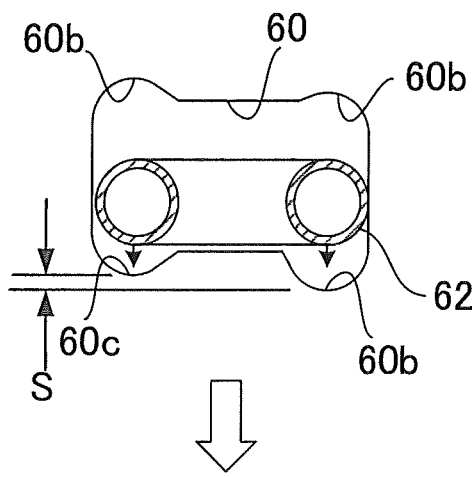
FIGS. 13A to 13C are explanatory views illustrating an assembling order of an arrangement example of the cooling pipes according to the sixth embodiment.
Figure 13B:
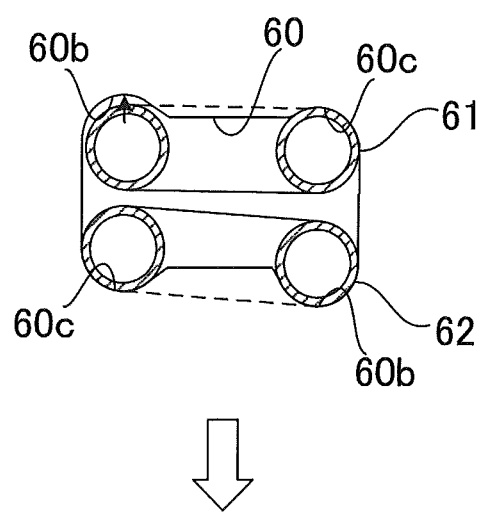
Figure 13C:
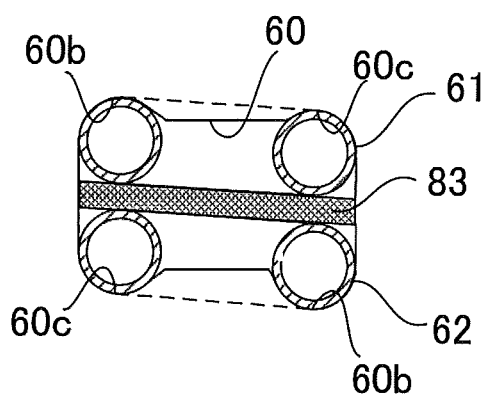

Next, the sixth embodiment will be described with reference to FIG. 12 and FIGS. 13A to 13C. FIG. 12 is a schematic cross-sectional view illustrating an armature according to the sixth embodiment. FIGS. 13A to 13C are explanatory views illustrating the assembling order in the arrangement of the cooling pipes according to the sixth embodiment. The components same as those in the linear motor 100 in the first embodiment are identified by the same numerals, and the description will be omitted.

As illustrated in FIG. 12, the arrangement of the cooling pipes 61 and 62 in the sixth embodiment is different from that in the first embodiment.

In the arrangement example of the sixth embodiment, the cooling pipe storage hole 60 is formed such that the general contour of its cross-sectional shape has a parallelogram with four arc-like corners. Specifically, a deep arc-like concave portion 60b is formed on one end of the top surface of the cooling pipe storage hole 60, while a shallow arc-like concave portion 60c is formed on the other end. Also, the deep arc-like concave portion 60b is also formed on one end of the bottom surface of the cooling pipe storage hole 60, while the shallow arc-like concave portion 60c is formed on the other end. The depth difference between the depth of the deep arc-like concave portion 60b and the shallow arc-like concave portion 60c is defined as S. The deep arc-like concave portions 60b and 60b on the top surface and on the bottom surface, as well as the shallow arc-like concave portions 60c on the top surface and on the bottom surface are diagonally located.

The cooling pipes 61 and 62 mounted in the cooling pipe storage hole 60 with a substantially parallelogram shape are inclined to the left or to the right, in terms of the relationship between the deep arc-like concave portions 60b and the shallow arc-like concave portions 60c on the top and bottom surfaces.

A plate-like heat insulating material 83 is provided between the upper and lower cooling pipes 61 and 62. Materials having low heat conductivity illustrated in the fourth embodiment are employed as the heat insulating material 83.

As illustrated in FIG. 12, the cooling pipe storage holes 60 formed on the core 30 of the armature 2 are formed, for example, such that the tilting direction is changed in an alternate manner with the right-shoulder up and then the right-shoulder down from the left in FIG. 12. When the cooling pipes 61 and 62 are stored in the cooling pipe storage hole 60 as in the present embodiment, the cooling pipes 61 and 62 are slightly elastically deformed. Since the cooling pipes 61 and 62 are made of a copper tube or an aluminum tube, they can easily be deformed elastically.

The cooling pipes 61 and 62 in the arrangement examples according to the sixth embodiment are assembled in the order illustrated in FIG. 13. Namely, in the arrangement example of the cooling pipes 61 and 62 in the sixth embodiment, the lower cooling pipe 62 is firstly mounted before the upper cooling pipe 61 as illustrated in FIG. 13A.

Then, the upper cooling pipe 61 is mounted in the cooling pipe storage hole 60 as illustrated in FIG. 13B. Next, as illustrated in FIG. 13C, by providing the heat insulating material 83 between the cooling pipes 61 and 62 after mounting the upper cooling pipe 61, the cooling pipes 61 and 62 can be elastically deformed, and the assembling operation of the cooling structure can be performed easily.

The sixth embodiment basically has the same function and effect as those of the first embodiment. In the sixth embodiment, the cooling pipes 61 and 62 are mounted in the cooling pipe storage hole 60 with a substantially parallelogram shape, such that the tilting direction is changed in an alternating manner with the right-shoulder up and then the right-shoulder down. Consequently, according to the sixth embodiment, the interference between the T-slot nut 51 and the cooling pipe storage hole 60 can be avoided, thereby the height of the armature 2 can be reduced.

In the sixth embodiment, even if the cooling pipes 61 and 62 are tilted to one side, the main flux of the permanent magnet is not hindered as illustrated in FIG. 12. Therefore, the sixth embodiment has a unique effect of being capable of reducing the magnetic resistance and increasing the maximum thrust force.

Seventh Embodiment

Figure 14:
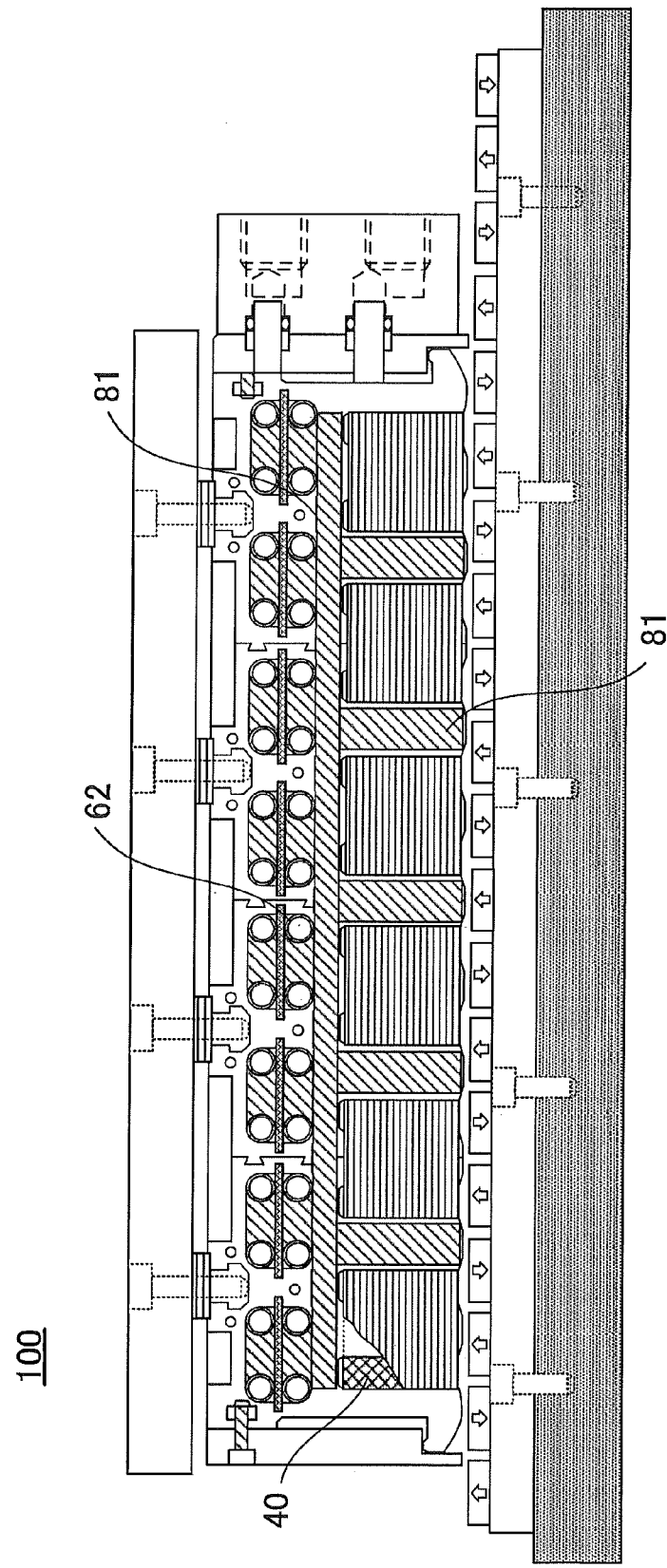
FIG. 14 is a cross-sectional view illustrating a linear motor along a longitudinal direction according to the seventh embodiment.
Figure 15:
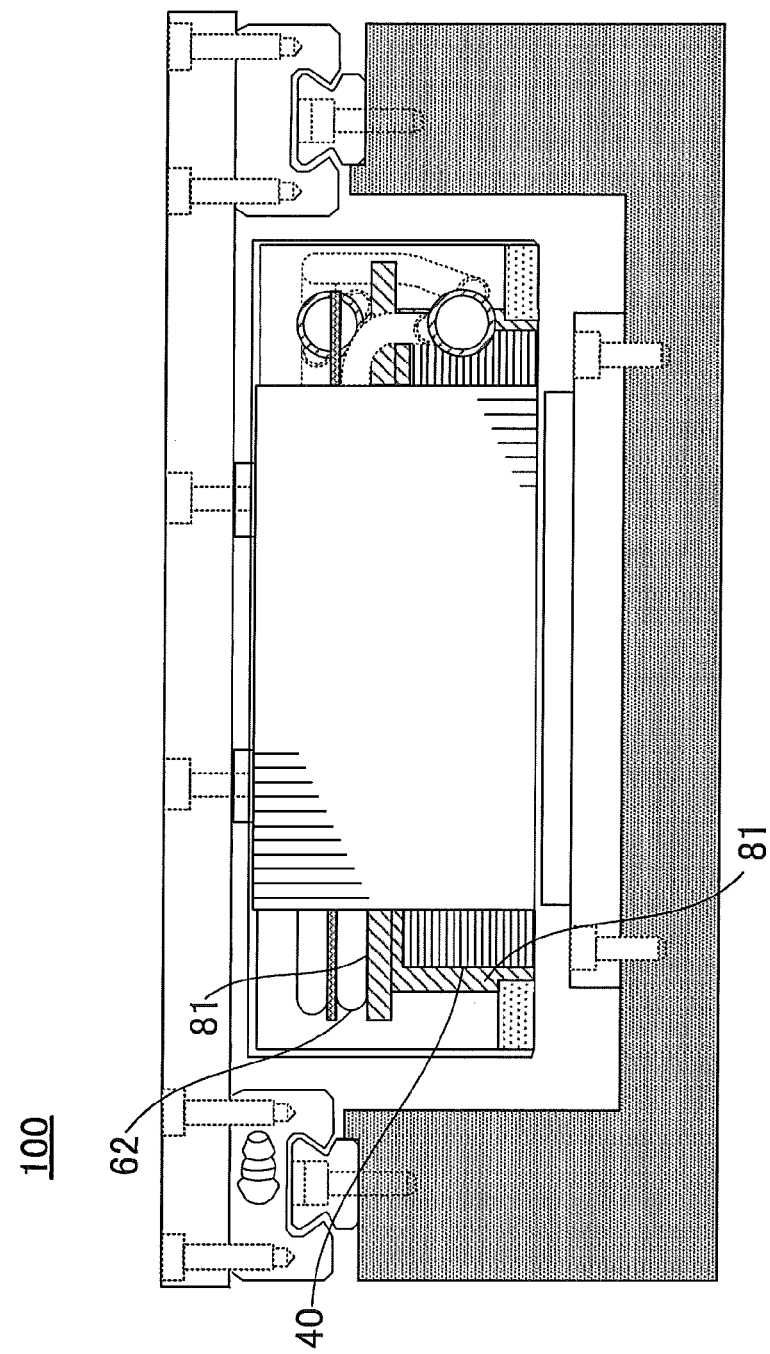
FIG. 15 is a right side view of the linear motor according to the seventh embodiment.

Next, the seventh embodiment will be described with reference to FIGS. 14 and 15. FIG. 14 is a cross-sectional view of the linear motor along a longitudinal direction according to the seventh embodiment. FIG. 15 is a right side view of the linear motor according to the seventh embodiment. The components same as those in the linear motor 100 in the first embodiment are identified by the same numerals, and the description will be omitted.

As illustrated in FIGS. 14 and 15, in the seventh embodiment, a plate-like heat transfer material 81 is provided between the lower cooling pipe 62 and an end part of the coil 40. A plate-like heat transfer material 81 may also be provided between the adjacent wound coils 40 and 40 on the end part of the coil 40.

The seventh embodiment basically has the same function and effect as those of the first embodiment. In particular in the seventh embodiment, the heat transfer material 81 is provided between the lower cooling pipe 62 and the end part of the coil 40. Therefore, the seventh embodiment has an effect of transferring more heat generated from the coil 40 to the cooling pipe 62, whereby the refrigerant absorbs more heat. As a result, the seventh embodiment has a unique effect of enhancing efficiency of cooling the heat from the coil 40 and being capable of realizing a highly-efficient linear motor 100 with low heat generation and high thrust force.

While certain preferred embodiments have been described, these embodiments are exemplary only and are not intended to limit the scope of the invention. Various modifications different from the embodiments described above are possible without departing from the scope of the present invention.

What is claimed is:

1. A linear motor comprising:
a field unit having a permanent magnet; and
an armature provided opposite to the permanent magnet and having a coil, wherein the armature comprising:
teeth that lay out and form a slot for storing the coil;
a core that connects the teeth and closes the top end of the slot; and
a plurality of cooling pipes vertically arranged in the core along a longitudinal direction and having a meander shape, wherein
the cooling pipes vertically adjacent to each other are arranged such that an inlet and an outlet of each of the cooling pipes are alternately connected in parallel to a refrigerant inlet and a refrigerant outlet, in order that a flow direction of the refrigerant becomes reverse to each other;
the core is formed with a plurality of cooling pipe storage holes for storing the cooling pipes along the longitudinal direction of the core, and wherein
the cross-sectional shape of the cooling pipe storage hole is a rectangle with four arc-like corners.

2. The linear motor according to claim 1, wherein the cooling pipe storage hole has a concave portion for storing the cooling pipe on at least either one of its top face and its bottom face.

3. The linear motor according to claim 1, wherein the cooling pipes are vertically brought into contact with each other in the cooling pipe storage hole.

4. The linear motor according to claim 1, wherein the cooling pipes vertically adjacent to each other in the cooling pipe storage hole are separated from each other.

5. The linear motor according to claim 4, wherein a heat insulating material is provided between the cooling pipes vertically adjacent to each other in the cooling pipe storage hole.

6. The linear motor according to claim 1, wherein a heat transfer material is provided between the cooling pipes laterally adjacent to each other in the cooling pipe storage hole.

7. The linear motor according to claim 1, wherein the surrounding of the cooling pipe is enclosed by a thermal conductive sheet.

8. The linear motor according to claim 1, wherein the cooling pipe storage hole and the cooling pipe stored in the cooling pipe storage hole tilt in one side in the longitudinal direction.

9. The linear motor according to claim 1, wherein a heat transfer material is provided between a cooling pipe of the cooling pipe, the cooling pipe being adjacent to an end part of the coil.

10. A linear motor, comprising:
a field unit having a permanent magnet;
an armature provided opposite to the permanent magnet and having a coil, wherein the armature includes:
teeth that lay out and form a slot for storing the coil;
a core that connects the teeth and closed a top end of the slot;
a plurality of cooling pipes vertically arranged in the core along a longitudinal direction and having a meander shape;
wherein:
the cooling pipes vertically adjacent to each other are arranged such than an inlet and an outlet of each of the cooling pipes are alternatively connected in parallel to a refrigerant inlet and a refrigerant outlet, such that a flow direction of refrigerant becomes reverse to each other;
the core is formed with a plurality of cooling pipe storage holes for storing the cooling pipes along the longitudinal direction of the core; and
a cross-sectional shape of the cooling pipe stores holes is along a part of an outer peripheral surface of at least one cooling pipe of the cooling pipes.

* * * * *